United States Patent
Urbanek

(10) Patent No.: US 6,926,514 B2
(45) Date of Patent: Aug. 9, 2005

(54) TWO-PLATE INJECTION MOLDING MACHINE

(75) Inventor: Otto Urbanek, Linz (AT)

(73) Assignee: Engel Mashinenbau Gesellschaft m.b.H., Schwertberg (AT)

( * ) Notice: Subject to any disclaimer, the term of this patent is extended or adjusted under 35 U.S.C. 154(b) by 114 days.

(21) Appl. No.: 10/310,373

(22) Filed: Dec. 5, 2002

(65) Prior Publication Data

US 2003/0113399 A1 Jun. 19, 2003

(30) Foreign Application Priority Data

Dec. 13, 2001 (AT) .................................. A 1950/2001

(51) Int. Cl.⁷ .................................................. B29C 45/64
(52) U.S. Cl. ....................................... 425/589; 425/595
(58) Field of Search ............................... 425/589, 590, 425/595

(56) References Cited

U.S. PATENT DOCUMENTS

| | | | | |
|---|---|---|---|---|
| 3,596,325 A | * | 8/1971 | Hehl | 425/589 |
| 3,761,214 A | * | 9/1973 | Hehl | 425/589 |
| 3,940,930 A | * | 3/1976 | Rosander | 425/590 |
| 4,822,274 A | | 4/1989 | Chan et al. | |
| 4,948,358 A | | 8/1990 | Kushibe et al. | |
| 5,110,283 A | * | 5/1992 | Bluml et al. | 425/589 |
| 5,352,394 A | * | 10/1994 | Fujita et al. | 425/589 |
| 5,536,166 A | | 7/1996 | Schad | |
| 5,776,516 A | * | 7/1998 | Armbruster et al. | 425/589 |
| 6,241,509 B1 | * | 6/2001 | Galt et al. | 425/595 |

FOREIGN PATENT DOCUMENTS

| | | |
|---|---|---|
| AT | 398290 | 9/1991 |
| DE | 1554930 | 4/1970 |
| DE | 1554932 | 7/1970 |
| DE | 4329070 | 3/1994 |
| DE | 19535081 | 3/1997 |
| JP | 8-39638 | 2/1996 |
| WO | 9417977 | 8/1994 |
| WO | WO01/58662 | 8/2001 |

* cited by examiner

Primary Examiner—James P. Mackey
(74) Attorney, Agent, or Firm—Notaro & Michalos PC

(57) ABSTRACT

A two-plate injection molding machine comprising a movable mold mounting plate and a stationary mold mounting plate and at most three bars passing through the edge region of the mold mounting plates, wherein the closing force is applied to the movable mold mounting plate by pull bars, wherein at least two corner regions of the mold mounting plates have pull bars passing therethrough.

12 Claims, 6 Drawing Sheets

TWO-PLATE INJECTION MOLDING MACHINE

The invention relates to a two-plate injection molding machine comprising a movable mold mounting plate and a stationary mold mounting plate and bar members which pass through the edge regions of the mold mounting plates, wherein the closing force is applied to the movable mold mounting plate by pull bars.

Conventional two-plate machines have four pull bar members and correspond in that respect to those injection molding machines in which the closing force is produced by a device arranged between the movable mold mounting plate and a support plate through which bar members pass. A disadvantage of those machines is that the space between the mold halves involves difficult access. Therefore, a series of proposals have been put forward, for transferring the concept of the injection molding machine which has no bar member, to two-plate machines. Basically, in that respect the starting point adopted was a single pull bar arranged outside the mold mounting plates, for carrying the closing force (for example WO 94/17977, DE 195 35 081 and U.S. Pat. No. 5,536,166). That arrangement causes the mold halves to gape open under the influence of the closing force unless provision is made for a compensatory counter-movement of the mold halves.

In connection with three-plate machines, it has already been pointed out in AT 398 290 that accessibility to the intermediate space between the mold halves can be increased by omitting machine bar members. The invention transfers that notion to the pull bars of two-plate machines and provides that at least one and at most three corner regions of the mold mounting plates have bar members passing therethrough.

That proposal is not obvious insofar as the advantage of easy accessibility to the intermediate space in the mold, in the case of machines in which at most three corner regions of the mold mounting plates have bar members passing therethrough, is paid for, with the disadvantage of reduced symmetry. In the case of three-plate machines that disadvantage is alleviated insofar as there the closing force is applied to the movable mold mounting plate not by the bar members but by a central hydraulic and electrical drive. Nonetheless machines with two bar members have never gained acceptance in the form of three-plate machines. In spite of the greater structural problems in the case of two-plate machines in which the bar members, as pull bars, transmit the closing force in particular also to the movable mold mounting plate, the concept according to the invention is meaningful. More specifically, in a completely novel fashion it makes it possible to reduce the ground surface area occupied by the machine, insofar as the metering and injection device provided on the rear side of the stationary mold mounting plate is fixed directly to the stationary mold mounting plate and sufficient space is available for same. That applies even if the drives for the two pull bars are arranged at the injection side, a measure which also greatly reduces the amount of ground surface area required at the closing side.

In an advantageous embodiment of the invention it is provided that two corner regions of the mold mounting plates each have at least two bar members passing therethrough. That increases the stability of the mold mounting plates in relation to tilting under the influence of the force of gravity which acts on the—usually very heavy—mold mounting plates. For the same reason, a further advantageous embodiment of the invention provides that at least one bar member is arranged in the edge region of the mold mounting plates between two corner regions. Another embodiment of the invention can provide that two pull bars are arranged in the corner regions of the mold mounting plates in a plane extending at 45° relative to the plane of symmetry of the machine. Another embodiment of the invention can provide that there are provided at most three pull bars which pass through the edge region of the mold mounting plates, for applying the closing force. For example two pull bars can be arranged to pass through both of the lower corner regions of the mold mounting plates and one pull bar is arranged to pass through one of the upper corner regions of the mold mounting plates.

When high-speed closure cylinders are provided, it is important for them to be arranged in the proximity of the corner regions of the mold mounting plates, through which bar members pass, in order not to impede easy access to the intermediate space of the mold, which is achieved in accordance with the invention.

Details of the invention are described hereinafter with reference to the drawing in which.

Figure 1:
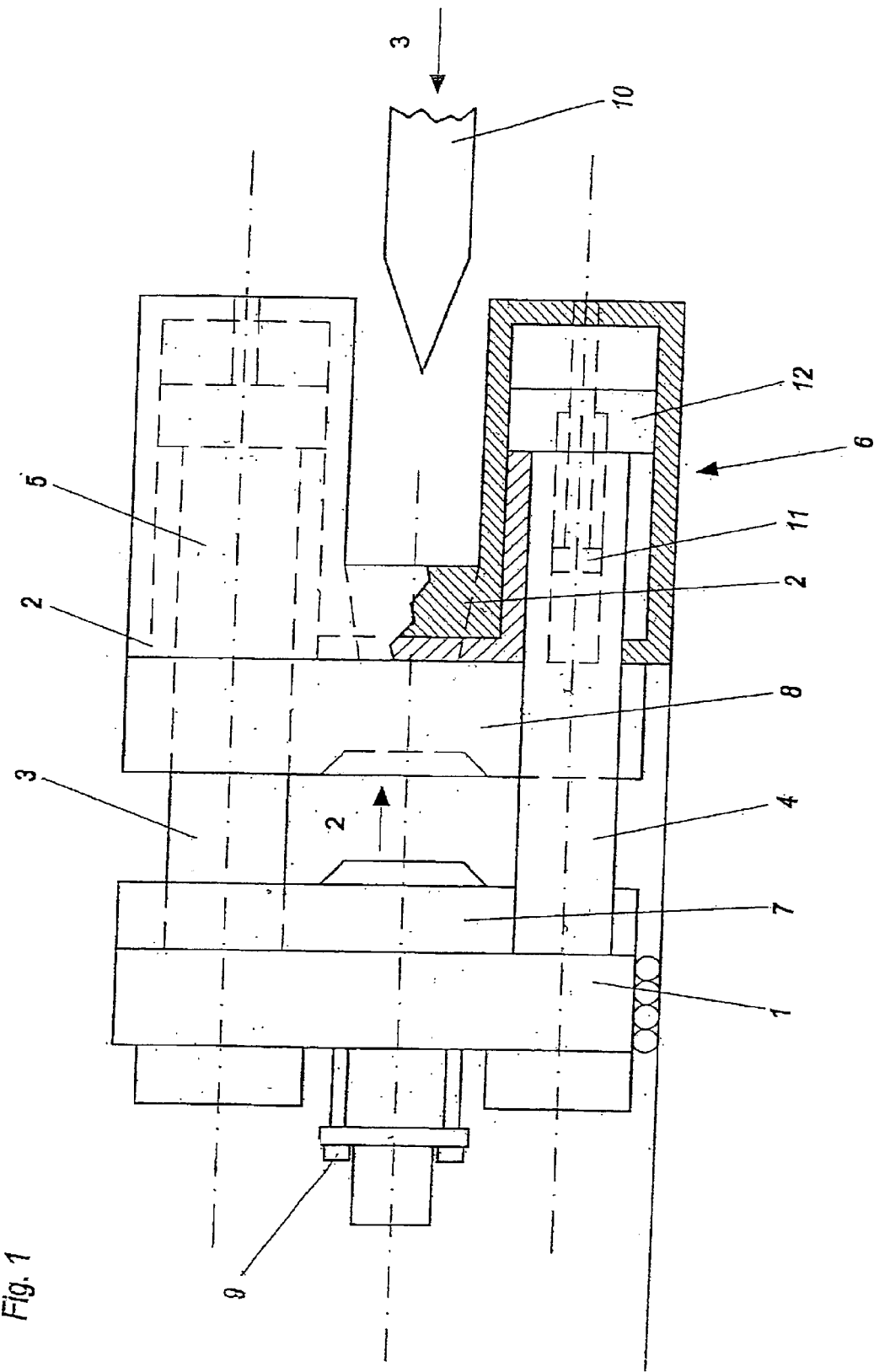
FIG. 1 is a diagrammatic side view of an embodiment of the invention.
Figure 4:
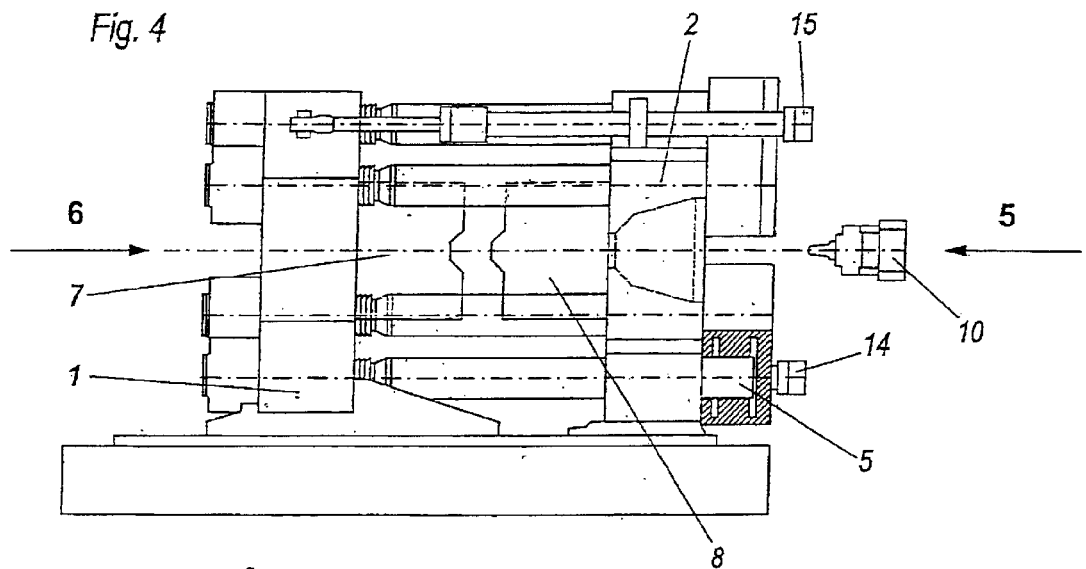
FIG. 4 is a diagrammatic side view of a further embodiment of the invention.

The illustrated injection molding machines have as essential parts a movable mold mounting plate 1 and a stationary mold mounting plate 2. They carry mold halves 7 and 8 which are held together by a closing force upon injection of the plastic material and which, after a molding is finished, are moved into the opened position as shown in FIG. 1 and FIG. 4 respectively. In that condition the finished product is ejected by the ejector 9 which is only shown in FIG. 1.

In the embodiment of FIG. 1 the movement of the mold mounting plate 1 and application of the closing force are implemented by means of two pull bars 3, 4 which can be displaced in both directions by means of respective drives 5, 6.

In the present case, hydraulic drives are provided, in which respect opening and closing of the mold is effected in known manner by introducing hydraulic fluid to the right or the left of the stationary internal piston 11, while application of the closing force or pulling-apart force respectively is effected by the space to the left or the right of the respective piston 12 connected to a pull bar 3, 4 being actuated.

Figure 5:
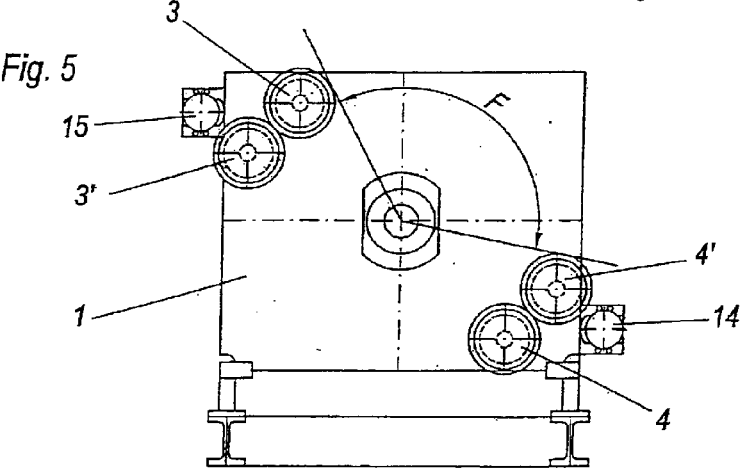
FIG. 5 shows the view 5 in FIG. 4.

In the particularly preferred embodiment shown in FIG. 4 the movement of the mold mounting plate 1 and the application of the closing force is effected by means of four pull bars 3, 3', 4, 4', wherein each two bars 3, 3' and 4, 4' are arranged in respective pairs in corner regions of the mold mounting plates 1, 2. The two pairs 3, 3' and 4, 4' are disposed in mutually diagonally opposite relationship in plan view on to the mold mounting plates 1, 2. A respective high-speed closure cylinder 14, 15 can be seen in the proximity of each pair (FIGS. 5 and 6).

Figure 2:
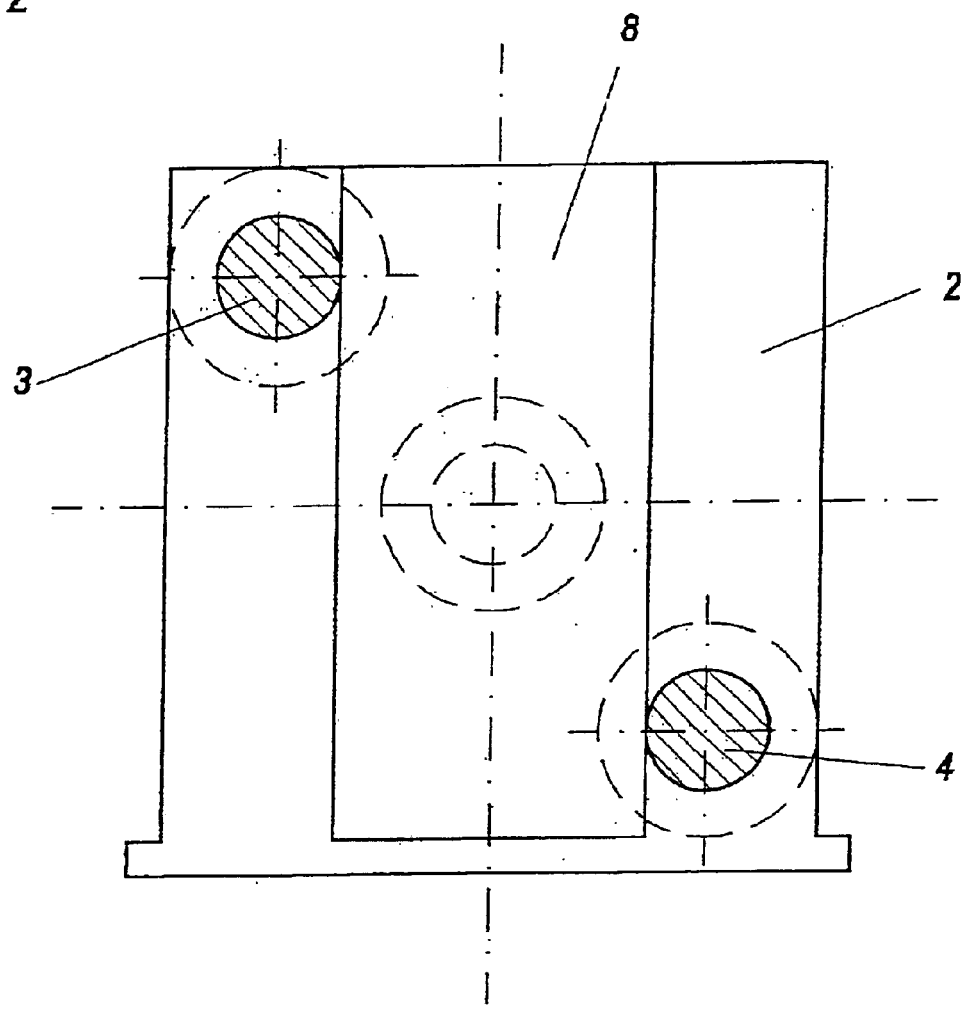
FIG. 2 shows the view 2 in FIG. 1.
Figure 3:
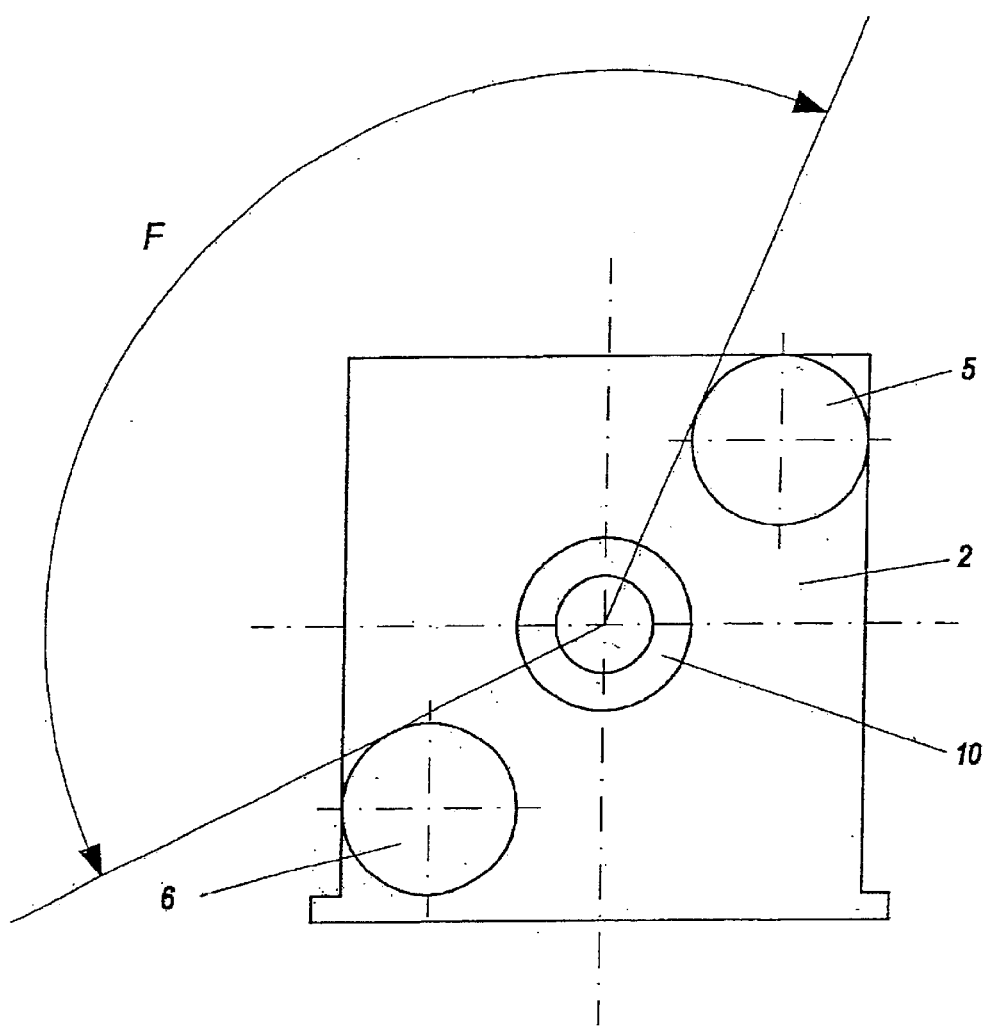
FIG. 3 shows the view 3 in FIG. 1.
Figure 6:
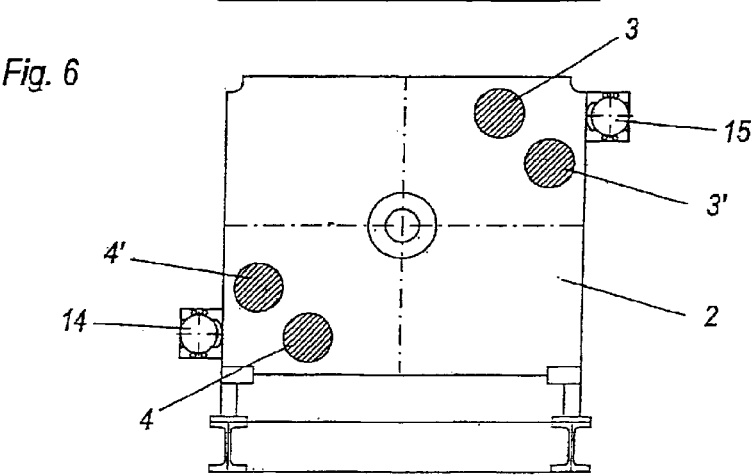
FIG. 6 shows the view 6 in FIG. 4.
Figure 7:
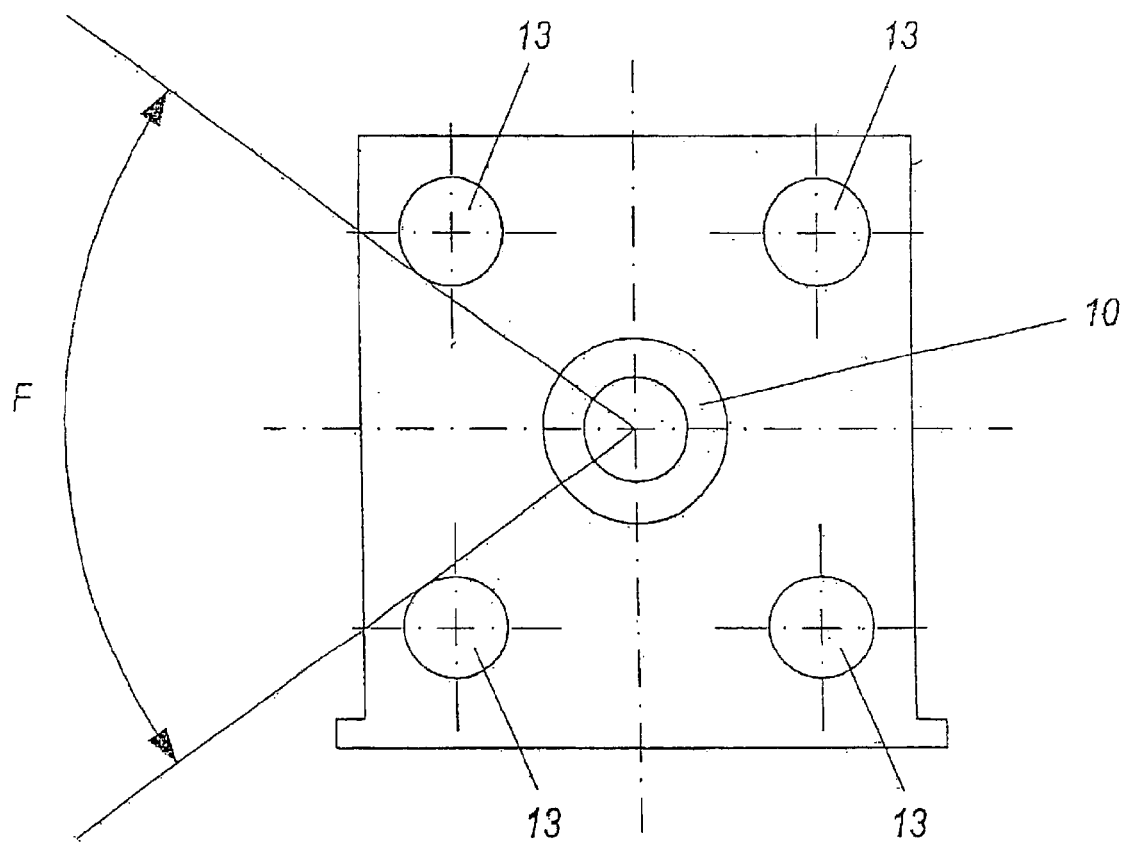
FIG. 7 is a diagrammatic representation of the situation of FIG. 2 in the state of the art.
Figure 8:
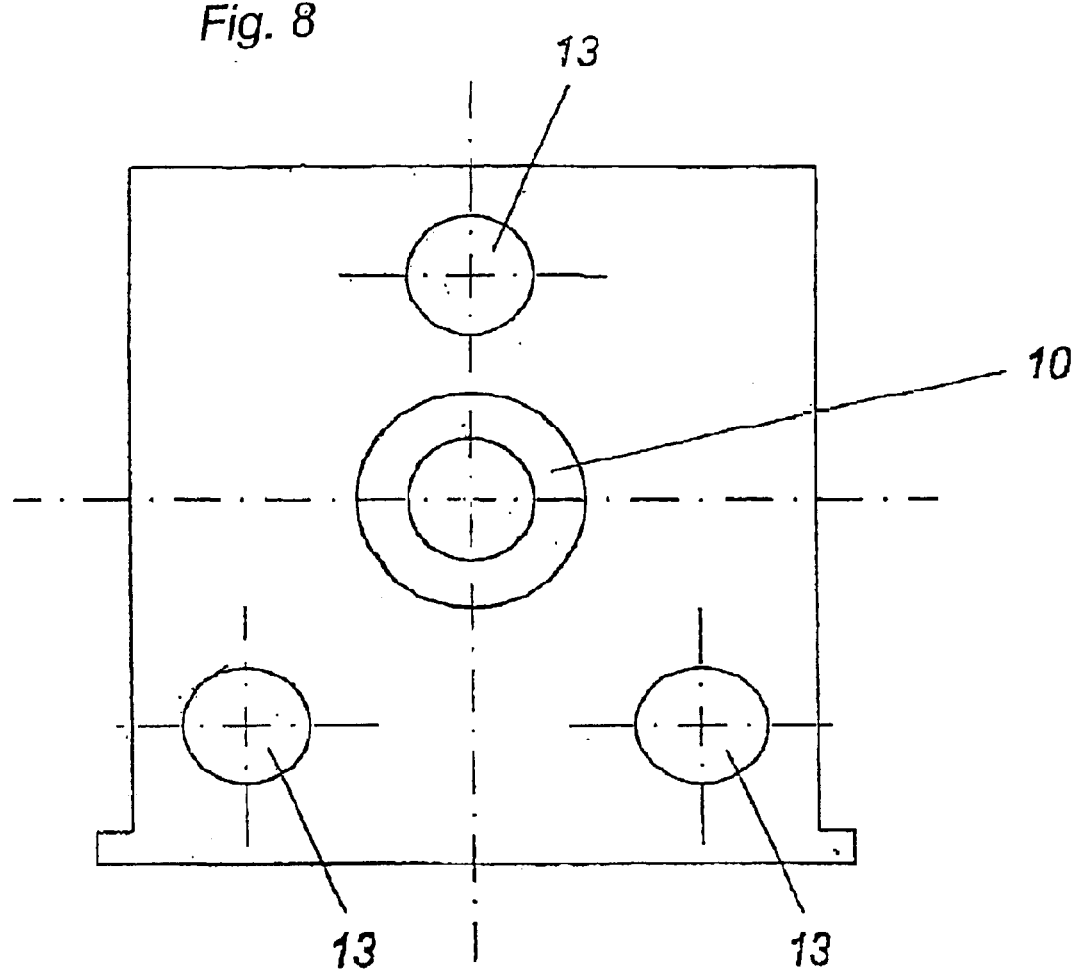
FIG. 8 is an end view similar to FIG. 2, but of another embodiment of the invention.

As mentioned, the omission of two pull bars 3, 4 or the paired arrangement of four pull bars 3, 3', 4, 4' facilitates access to the space between the mold halves 7, 8 or between the mold mounting plates 1, 2, as can be seen from FIGS. 2 and 6 respectively. An unexpected advantage however occurs by virtue of the fact that, as can be seen from a comparison between FIG. 3 or FIG. 5 (invention) and FIG. 7 (state of the art), the free space F for docking and operation of the injection unit 10 only diagrammatically shown in FIGS. 1 and 4 is substantially enlarged. The injection unit 10 can now be anchored directly to the rear of the stationary mold mounting plate 2. That advantage is felt in particular if the drives 5, 6 of the pull bars 3, 4 and 3', 4' respectively are moved to the right side of the machine, so that the dimensions at the closing side are only determined by the opening travel of the mold mounting plate 1 and the size of the ejector 9.

What is claimed is:

1. A two-plate injection molding machine comprising a movable mold mounting plate and a stationary mold mounting plate and bar members which pass through the edge regions of the mold mounting plates, wherein at least two of the bar members are pull bars and wherein closing force is applied to the movable mold mounting plate by the pull bars and wherein at least one and at most three corner regions of the mold mounting plates have bar members passing therethrough, and wherein two corner regions of the mold mounting plates each have at least two bar members passing therethrough.

2. An injection molding machine as set forth in claim 1, wherein said injection molding machine has two quick-action closure cylinders which are respectively arranged at the two corner regions of the mold mounting plates through which bar members pass.

3. An injection molding machine as set forth in claim 1, wherein at least one bar member is arranged in the edge region of the mold mounting plates between two corner regions.

4. An injection molding machine as set forth in claim 1, wherein two pairs of pull bars are arranged in the corner regions of the mold mounting plates in a plane extending at 45° relative to the plane of symmetry of the machine.

5. An injection molding machine as set forth in claim 1, wherein associated with each pull bar is a drive which is arranged on the side of the stationary mold mounting plate, which is remote from the movable mold mounting plate.

6. A two-plate injection molding machine comprising a movable mold mounting plate and a stationary mold mounting plate and bar members which pass through the edge regions of the mold mounting plates, wherein at least two of the bar members are pull bars and wherein closing force is applied to the movable mold mounting plate by pull bars and wherein at least one and at most three corner regions of the mold mounting plates have bar members passing therethrough, and wherein at least one bar member is arranged in the edge region of the mold mounting plates between two corner regions.

7. An injection molding machine as set forth in claim 6, wherein there are provided at most three pull bars which pass through the edge region of the mold mounting plates, for applying the closing force.

8. An injection molding machine as set forth in claim 6, wherein associated with each pull bar is a drive which is arranged on the side of the stationary mold mounting plate, which is remote from the movable mold mounting plate.

9. A two-plate injection molding machine comprising a movable mold mounting plate and a stationary mold mounting plate and bar members which pass through the edge regions of the mold mounting plates, wherein at least two of the bar members are pull bars and wherein closing force is applied to the movable mold mounting plate by the pull bars only, and wherein at least two and at most three corner regions of the mold mounting plates have bar members passing therethrough, and wherein one of said corner regions of the mold mounting plates having bar members passing therethrough is a lower corner region of said mold mounting plate and one of said corner regions of the mold mounting plates having bar members passing therethrough is an upper corner region of said mold mounting plate.

10. An injection molding machine as set forth in claim 9, wherein there are provided at most three pull bars which pass through the edge region of the mold mounting plates, for applying the closing force.

11. An injection molding machine as set forth in claim 9, wherein two pull bars are arranged in the corner regions of the mold mounting plates in a plane extending at 45° relative to the plane of symmetry of the machine.

12. An injection molding machine as set forth in claim 9, wherein associated with each pull bar is a drive which is arranged on the side of the stationary mold mounting plate, which is remote from the movable mold mounting plate.

* * * * *